United States Patent [19]
Miyata et al.

[11] Patent Number: 6,065,839
[45] Date of Patent: May 23, 2000

[54] MATERIAL EXHIBITING APPARATUS

[75] Inventors: Masami Miyata; Yoshikazu Ohara, both of Nagoya, Japan

[73] Assignee: Elmo Co., Ltd., Aichi, Japan

[21] Appl. No.: 09/168,574

[22] Filed: Oct. 8, 1998

[30] Foreign Application Priority Data

Oct. 16, 1997 [JP] Japan .................................. 9-303543

[51] Int. Cl.[7] .............................. H04N 1/04; G03B 21/14
[52] U.S. Cl. ........................................... 353/122; 348/370
[58] Field of Search ................................ 353/63, 65, 122, 353/DIG. 3, DIG. 4; 348/333, 370; 355/44

[56] References Cited

U.S. PATENT DOCUMENTS

| | | | |
|---|---|---|---|
| 4,690,527 | 9/1987 | Ohtorii ...................................... | 353/65 |
| 4,811,110 | 3/1989 | Ohmura et al. ......................... | 353/122 |
| 5,430,484 | 7/1995 | Nagene et al. .......................... | 348/370 |
| 5,444,486 | 8/1995 | Mizuno et al. .......................... | 348/370 |
| 5,642,206 | 6/1997 | Yamamori et al. ..................... | 348/370 |
| 5,645,335 | 7/1997 | Brunner et al. ......................... | 353/122 |
| 5,795,048 | 8/1998 | Umei ....................................... | 353/122 |

*Primary Examiner*—William Dowling
*Attorney, Agent, or Firm*—Koda & Androlia

[57] ABSTRACT

A material exhibiting apparatus displays an image of a material and a character such as an arrow on a display screen in an overlapped state. A location of a display area is set in synchronization with horizontal and vertical synchronizing signals. The set location of the display area is changed by varying a generation timing of either one or both of the horizontal and vertical synchronizing signals. A display location of the character is changed by changing the set location of the display area. Since the display location of the character is quickly changed on the basis of frequencies of the horizontal and vertical synchronizing signals, the movement of the character can continuously be displayed on the display screen.

4 Claims, 7 Drawing Sheets

MATERIAL EXHIBITING APPARATUS

BACKGROUND OF THE INVENTION

1. Field of the Invention

This invention relates to a material exhibiting apparatus in which an image taken by a video camera and character are displayed on a display screen of a video image reproducing unit in an overlapped state.

2. Description of the Prior Art

A manuscript or an object placed on a stage is taken by a video camera in conventional material exhibiting apparatuses. An image of material or object is displayed on a display screen of a video image reproducing unit on the basis of an obtained image signal. A predetermined display area is fixedly set so as to correspond to the display screen. A character display signal for displaying a character at a display location designated by a section of the display area is synchronized with horizontal and vertical synchronizing signals together with the image signal, so that a predetermined character such as arrow is displayed on the display screen displaying the image in an overlapped state. In this case, the material is pointed out by the arrow on the display screen, for example.

However, the display area is fixedly set to correspond to the display screen and divided equally both in the horizontal and vertical directions so that the display location for the character is designated. When the display location of the character is changed from one to another on the display screen, the character is moved sequentially for every divided section on the basis of horizontal and vertical character display location designation signals supplied to a controller. The display area is divided into 24 sections in the horizontal direction and 12 sections in the vertical direction, for example. Accordingly, the arrow on display is moved in a stepwise manner. Particularly when moved obliquely, the arrow zigzags, resulting in an unnatural feeling. Furthermore, the display location of the character is limited by the number of divided sections. Consequently, the usability of the material exhibiting apparatus is reduced.

SUMMARY OF THE INVENTION

Therefore, an object of the present invention is to provide a material exhibiting apparatus in which the character overlaps the image on the display screen can smoothly be moved.

Another object of the invention is to provide a material exhibiting apparatus in which an operation for changing a set location for the display area can quickly be executed.

Further another object of the invention is to provide a material exhibiting apparatus in which a maximum display area for the character can be obtained.

The present invention provides a material exhibiting apparatus comprising a video camera for taking an image of a material placed on a stage, thereby obtaining an image signal representative of the material, image displaying means for displaying an image of the material on an image screen on the basis of the image signal supplied thereto from the video camera, display area setting means for setting a display area corresponding to the display screen, display location designating means for designating a display location of a character by dividing the display area, character displaying means for displaying a predetermined character at the display location designated by the display location designating means, synchronizing signal generating means for generating an image synchronizing signal, a horizontal synchronizing signal and a vertical synchronizing signal, wherein display of the image of the material by the image displaying means is synchronized with the image synchronizing signal and the setting of the display area by the display area setting means is synchronized with the horizontal and vertical synchronizing signals both synchronous with the image synchronizing signal so that the image of the material and the character are displayed on the display screen in an overlapped state, and timing varying means for varying either one or both of generation timings of the horizontal and vertical synchronizing signals with respect to the display area setting means so that a location of the set display area is changed.

According to the above-described material exhibiting apparatus, the location of the display area set so as to correspond to the display screen is changed by varying either one or both of the generation timings of the horizontal and vertical synchronizing signals. Consequently, the display location of the character can be changed by changing the set location of the display area but not by designating a section of the display area. Furthermore, the display location of the character is quickly changed on the basis of frequencies of the vertical and horizontal synchronizing signals. Consequently, movement of the character on the display screen can continuously be displayed. Additionally, the display location of the character can be prevented from being limited by the number of sections of the display area.

In a preferred form, the generation timing of the vertical synchronizing signal is varied by the timing varying means on the basis of a first timing varying signal delivered when the horizontal synchronizing signals synchronized with the vertical synchronizing signal are counted and an obtained count agrees with coordinates of a vertical location supplied for the changing of the location of the set display area, and the generation timing of the horizontal synchronizing signal is varied by the timing varying means on the basis of a second timing varying signal delivered when the vertical synchronizing signals synchronized with the horizontal synchronizing signal are counted and an obtained count agrees with coordinates of a horizontal location supplied for the changing of the location of the set display area. Consequently, the set location of the display area can be changed further quickly.

In another preferred form, the display area is generally rectangular and a display location of the character is fixed on an upper left-hand corner of the display area. When the display location of the character is thus fixed on the upper left-hand corner of the display area, a range in which the character can be displayed is rendered maximum and can cover substantially the entire area of the display screen. Consequently, the usability of the material exhibiting apparatus can be improved.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENT

Figure 1:
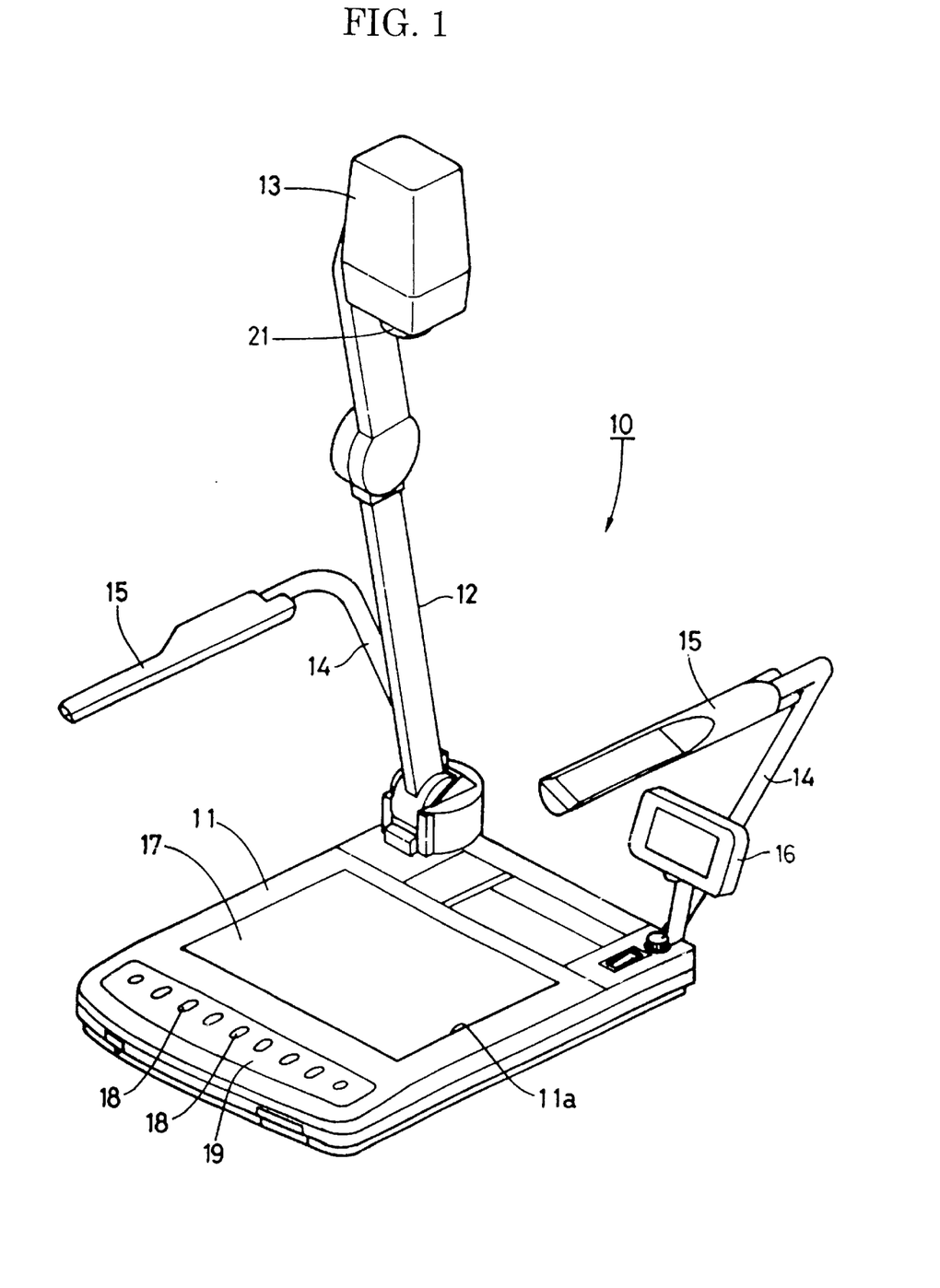
FIG. 1 is a perspective view of the material exhibiting apparatus of one embodiment in accordance with the present invention.

One embodiment of the present invention will be described with reference to the accompanying drawings. Referring to FIG. 1, a material exhibiting apparatus 10 in accordance with the invention is shown. The material exhibiting apparatus 10 comprises a stage 11 on which a material such as manuscript or object is placed, a foldable column 12 standing at a rear corner of the stage 11, and a video camera 13 supported on the column 12 so as to be located over a central portion of the stage 11. A pair of arms 14 are mounted on both ends of a rear wall of the stage 11 respectively. Two illumination lamps 15 are mounted on distal ends of the arms 14 for illuminating the material placed on the stage 11 respectively. A monitor television 16 is mounted on a rear corner of the stage 11 opposite the column 12. The stage 11 has a central rectangular opening 11a which is covered with a milk-white semitransparent diffusion plate 17 formed of an acrylic resin. Another illumination lamp (not shown) is provided in the stage 11 for illuminating the material on the stage 11 from below the material. An operation panel 19 including various operation switches 18 is mounted on a front of the stage 11.

Figure 2:
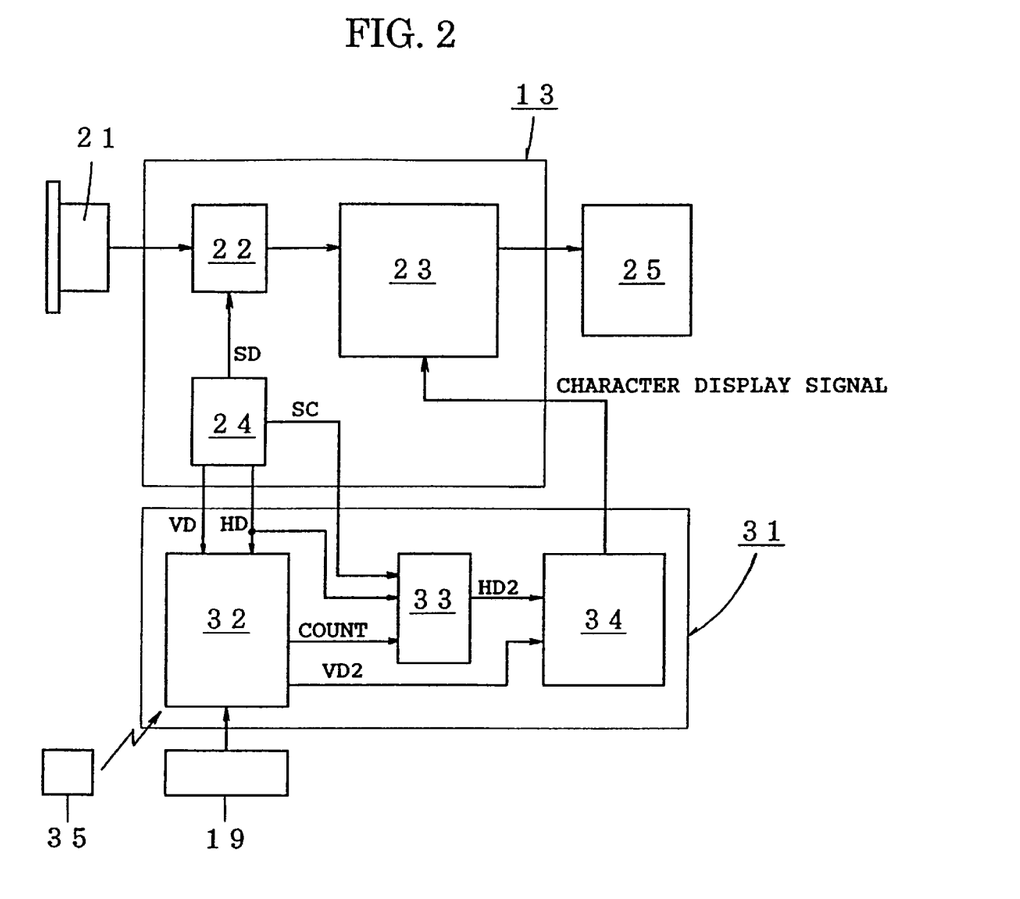
FIG. 2 is a schematic block diagram showing the electrical arrangement of the material exhibiting apparatus.

Referring now to FIG. 2, the video camera 13 includes a taking lens 21, a CCD image sensor 22, a well known signal processing circuit 23 for converting a photoelectric signal delivered from the CCD image sensor 22 to a corresponding video image signal, and a synchronizing signal generating circuit 24 for delivering an image synchronizing signal SD to a driver of the CCD image sensor 22. The video image signal processed by the signal processing circuit 23 is delivered to a video image reproducing unit 25 such as an external television or video projector, so that an image of the material is displayed on a display screen on the basis of the video image signal.

A character displaying operation control section 31 comprises a microcomputer 32, a horizontal counter 33, an OSD 34, and a remote controller 35. The microcomputer 32 comprises a CPU, various memories, an input-output interface, a counter and a counter register, none of which are shown. Based on signals from the operation switches 18 on the operation panel 19 and the remote controller 35, the microcomputer 32 delivers various character display control signals according to a predetermined processing program, as will be described later.

The synchronizing signal generating circuit 24 delivers clock signals SC, horizontal synchronizing signals HD, and vertical synchronizing signals VD as well as the image synchronizing signals SD. The clock signals SC and the horizontal synchronizing signals HD are delivered to the horizontal counter 33. The horizontal and vertical synchronizing signals HD and VD are delivered to the microcomputer 32. The horizontal counter 33 delivers horizontal synchronizing signals HD2 to the OSD 34. The microcomputer 32 delivers a counted value to the horizontal counter 33. The microcomputer 32 further delivers vertical synchronizing signals VD2 to the OSD 34. The OSD 34 delivers a character display signal to the signal processing circuit 23, so that the character display signal is delivered to the video image reproducing unit 25 in synchronization with the video image signal. As a result, an image and a character are displayed on the display screen of the video image reproducing unit 25 in an overlapped state.

Figure 3:
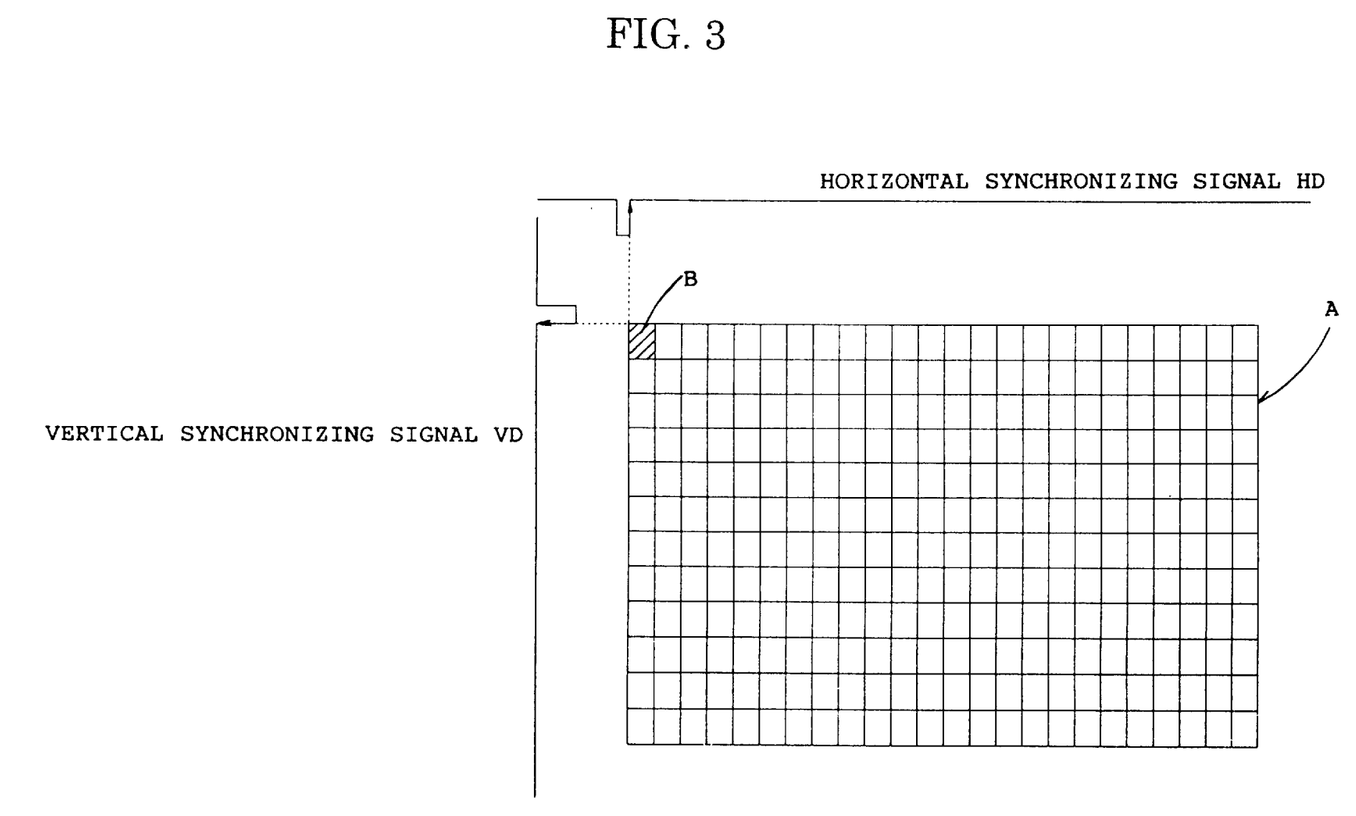
FIG. 3 is a view explaining the setting of a display area A for a character according to on-screen character display 34(OSD)

Referring to FIG. 3, a display area A set by the OSD 34 for the character so as to correspond to the display screen is shown. In synchronization with rise of each of the horizontal and vertical synchronizing signals HD and VD, the OSD 34 sets the display area A in a matrix of 12 lines and 24 rows. The OSD 34 sets X-Y coordinates relative to the display area. Based on a character display location designating signal delivered from the microcomputer 32, the OSD 34 designates one of sections of the display area obtained by dividing the display area by the matrix of 12 lines and 24 rows, thereby designating a display location B of the character. FIG. 3 shows the case where the display location of the character is designated at an upper left-hand corner of the display area A.

Figure 4A:
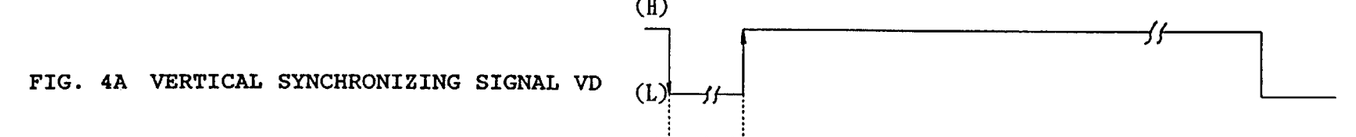
FIGS. 4A to 4C are timing charts showing the operation for changing the vertical location of the display area A set according to OSD 34.
Figure 4B:
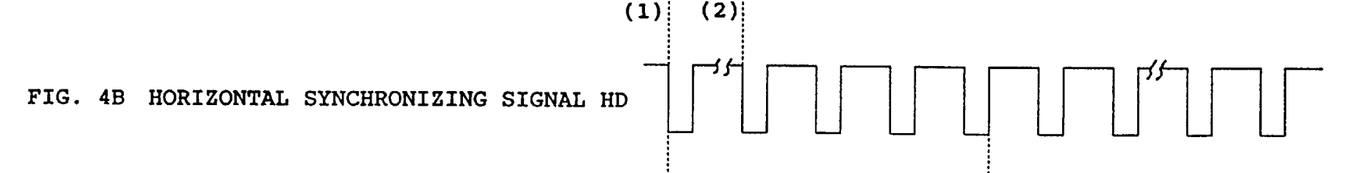
Figure 4C:
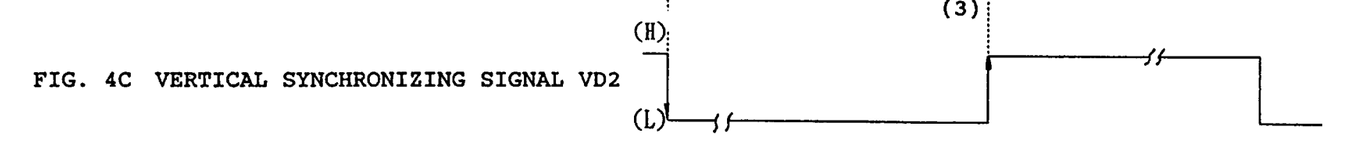

FIGS. 4A to 4C are timing charts showing the operation for changing the vertical location of the display area A set in the OSD 34. Coordinate values of the vertical location of the character input from the operation switch 18 or the remote controller 35 are stored in the counter register of the microcomputer 32 in synchronization with the fall (1) of the vertical synchronizing signal VD supplied to the microcomputer 32. Simultaneously, the vertical synchronizing signal delivered from the microcomputer 32 is turned to the low level. The rise of the horizontal synchronizing signal HD is counted in synchronization with the rise (2) of the vertical synchronizing signal VD. The vertical synchronizing signal VD2 is turned to the high level when the count agrees with the coordinate values of the character vertical location stored in the counter register(3).

Figure 5:
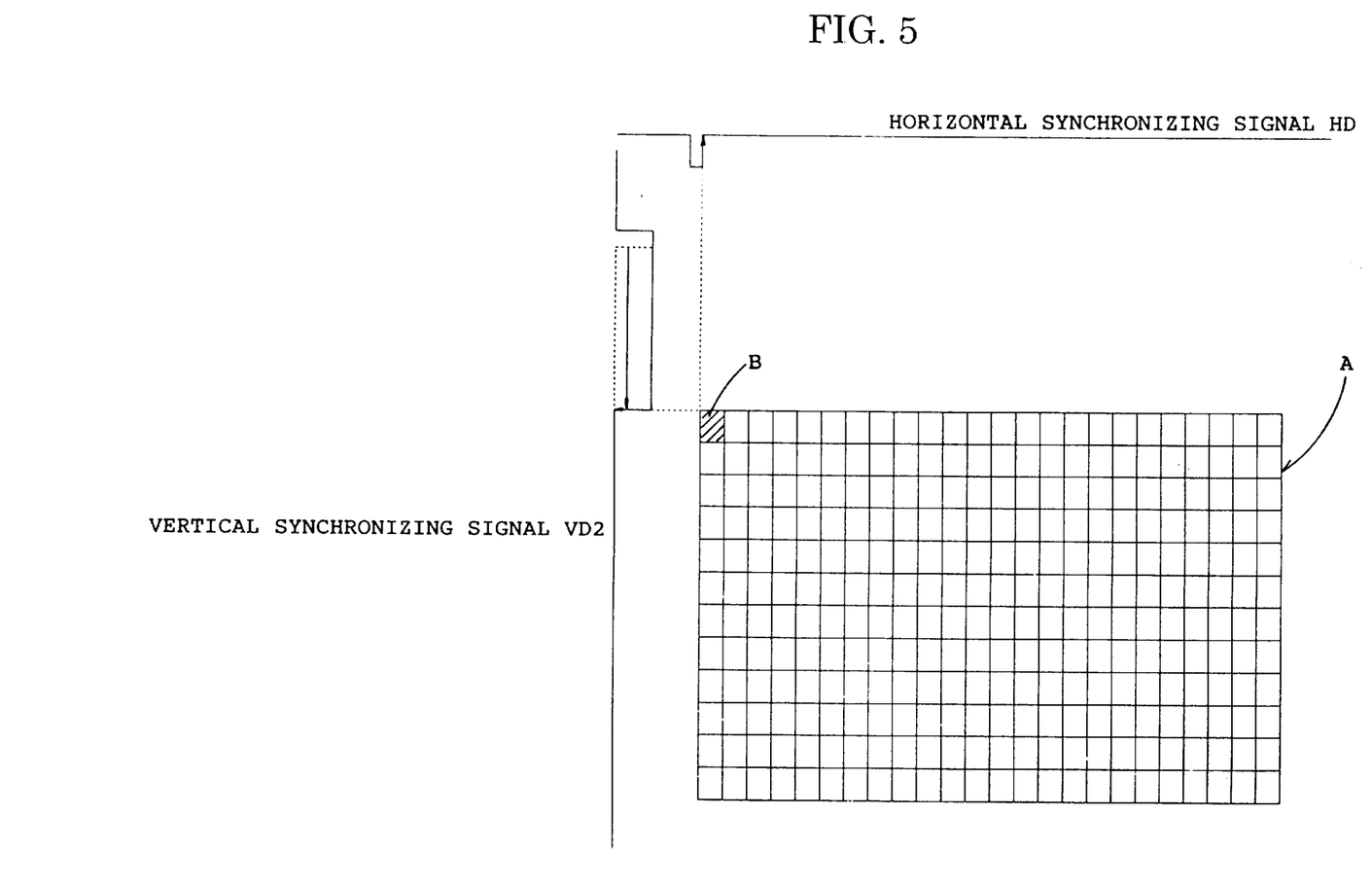
FIG. 5 is a view explaining the vertical movement of the location of the display area A set according to OSD 34.

Referring now to FIG. 5, the display area A is set by the OSD 34 in synchronization with the rise of the horizontal synchronizing signal HD and the rise of the vertical synchronizing signal VD2 whose generation timing is delayed. The set location is changed vertically. Accordingly, the set location of the display area A is vertically moved when the coordinate values of the vertical locations of the character are sequentially stored in the counter register of the microcomputer 32 by the operation switch 18 or the remote controller 35. A display location B of the character moved with the movement of the display area A is delivered to the signal processing circuit 23 on the basis of the character display signal from the OSD 34. The signal processing circuit 23 delivers the display location B of the character to the video image reproducing unit 25 in synchronization with the video image signal, so that the video image and the character are displayed on the display screen in an overlapped state. Since the movement of the character is quickly carried out on the basis of the frequency of the horizontal synchronizing signal HD, the character is smoothly moved on the display screen without stepwise movement.

Figure 6A:
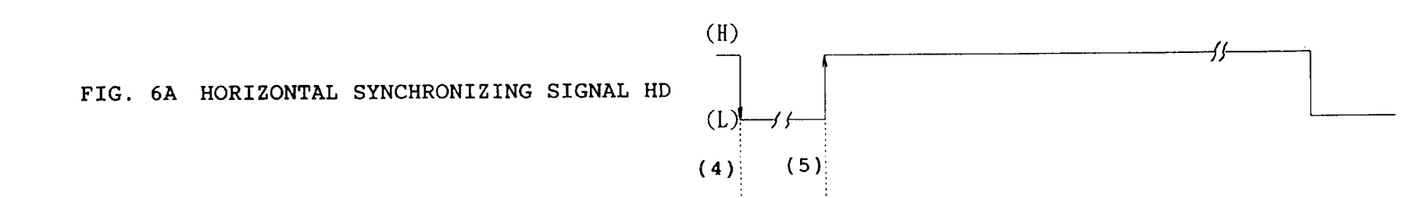
FIGS. 6A to 6C are timing charts showing the operation for changing the horizontal location of the display area A set according to OSD 34.
Figure 6B:
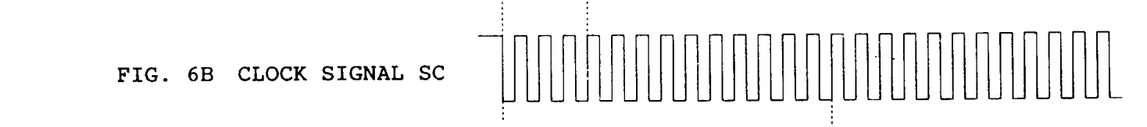
Figure 6C:
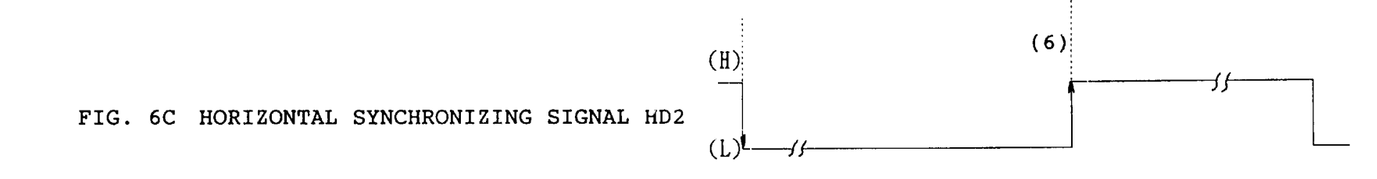

FIGS. 6A to 6C are timing charts showing the operation for changing the horizontal location of the display area A having been vertically moved as shown in FIGS. 4A to 4C. Coordinate values of the horizontal location of the character input from the operation switch 18 or the remote controller 35 are stored via the microcomputer 32 in the register of the horizontal counter 33 in synchronization with the fall (4) of the horizontal synchronizing signal HD supplied to the microcomputer 32. Simultaneously, the horizontal synchronizing signal HD2 delivered from the horizontal counter 33 is turned to the low level. The rise of the clock signal SC is counted in synchronization with the rise (5) of the horizontal synchronizing signal HD. The horizontal synchronizing signal HD2 is turned to the high level when the count agrees with the coordinate values of the character horizontal location stored in the counter register (6). The clock signal SC may be supplied directly to the microcomputer 32 and the horizontal synchronizing signal may be delivered to the OSD 34 without using the horizontal counter 33.

Figure 7:
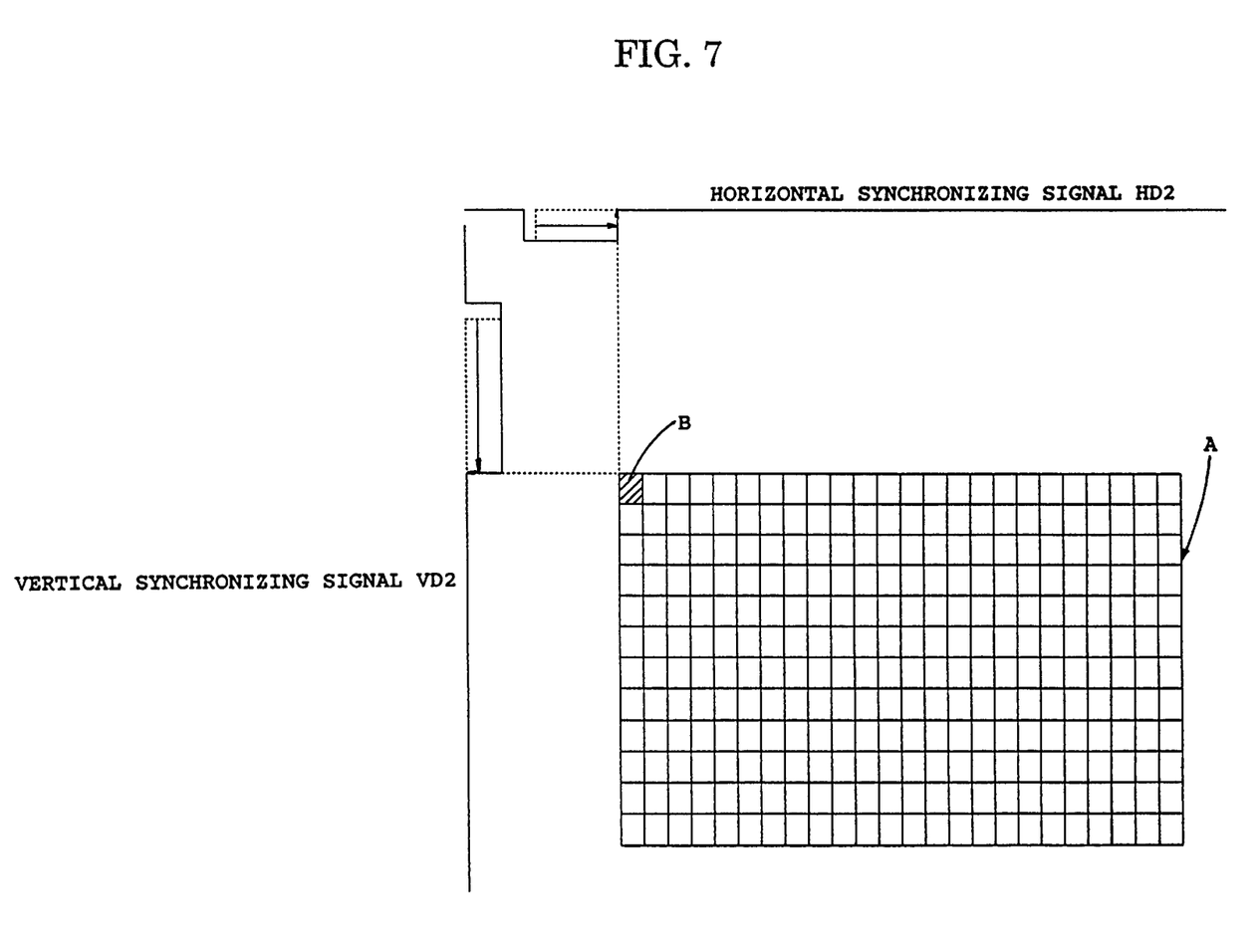
FIG. 7 is a view explaining the vertical and horizontal movement of the set location of the display area A.

Referring to FIG. 7, the set location of the display area A of the matrix of 12 lines and 24 rows set by the OSD 34 is changed vertically and horizontally in synchronization with the rise of each of the horizontal and vertical synchronizing signals HD2 and VD2 each of which generation timing is delayed. Accordingly, the set location of the display area A having been vertically moved is horizontally moved when the coordinate values of the horizontal locations of the character are sequentially stored in the register of the horizontal counter 33 by the operation switch 18 or the remote controller 35. The display location B of the character moved with the movement of the display area A is delivered to the signal processing circuit 23 on the basis of the character display signal from the OSD 34. The signal processing circuit 23 delivers the display location B of the character to the video image reproducing unit 25 in synchronization with the video image signal, so that the video image and the character are displayed on the display screen in an overlapped state. Since the movement of the character is quickly carried out on the basis of the frequencies of the horizontal synchronizing signal HD and the clock sing SC, the character is smoothly moved on the display screen without stepwise movement. The above-described vertical and horizontal movements of the character are simultaneously executed and synthesized so that the character is moved obliquely.

According to the above-described embodiment, the set location of the display area A set in synchronization with the horizontal and vertical synchronizing signals HD and VD is changed by varying the generation timing of either one or both of the horizontal and vertical synchronizing signals. The display location of the character can be changed by changing the set location of the display area A. Since the display location of the character is quickly changed on the basis of the frequencies of the horizontal and vertical synchronizing signals, the movement of the character can continuously be displayed on the display screen. Furthermore, the display location of the character is not limited by the number of divided sections of the display area. When the display location of the character is fixed at the upper left-hand corner of the display area A, a range in which the character can be displayed is rendered maximum and can cover substantially the entire area of the display screen.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A material exhibiting apparatus comprising:

a video camera for taking an image of a material placed on a stage, thereby obtaining an image signal representative of the material;

image displaying means for displaying an image of the material on an image screen on the basis of the image signal supplied thereto from the video camera;

display area setting means for setting a display area corresponding to the image screen;

display location designating means for designating a display location of a character by dividing the display area;

character displaying means for displaying a predetermined character at the display location designated by the display location designating means;

synchronous signal generating means for generating an image synchronizing signal, a horizontal synchronizing signal and a vertical synchronizing signal;

wherein display of the image of the material by the image displaying means is synchronized with the image synchronizing signal and the setting of the display area by the display area setting means is synchronized with the horizontal and vertical synchronizing signals both synchronous with the image synchronizing signal so that the image of the material and the character are displayed on the display screen in an overlapped state; and timing varying means for varying either one or both of generation timings of the horizontal and vertical synchronizing signals with respect to the display area setting means so that a location of the set display area is changed.

2. A material exhibiting apparatus according to claim 1, wherein the generation timing of the vertical synchronizing signal is varied by the timing varying means on the basis of a first timing varying signal delivered when the horizontal synchronizing signals synchronized with the vertical synchronizing signal are counted and an obtained count agrees with coordinates of a vertical location supplied for the changing of the location of the set display area, and the generation timing of the horizontal synchronizing signal is varied by the timing varying means on the basis of a second timing varying signal delivered when the vertical synchronizing signals synchronized with the horizontal synchronizing signal are counted and an obtained count agrees with coordinates of a horizontal location supplied for the changing of the location of the set display area.

3. A material exhibiting apparatus according to claim 1, wherein the display area is generally rectangular and a display location of the character is fixed on an upper left-hand corner of the display area.

4. A material exhibiting apparatus according to claim 2, wherein the display area is generally rectangular and a display location of the character is fixed on an upper left-hand corner of the display area.

* * * * *